United States Patent [19]

Arbisi

[11] Patent Number: 4,498,551
[45] Date of Patent: Feb. 12, 1985

[54] BATTERY-DRIVEN VEHICLE AND RECHARGING SYSTEM

[76] Inventor: Dominic S. Arbisi, 13001 Berkshire Dr., Minnetonka, Minn. 55343

[21] Appl. No.: 427,839

[22] Filed: Sep. 29, 1982

[51] Int. Cl.³ .............................................. B60K 7/00
[52] U.S. Cl. .................................. 180/65.5; 318/144
[58] Field of Search ................... 180/65.3, 65.4, 65.5, 180/65.2, 65.1, 2.2; 318/139, 144 X, 345 G

[56] References Cited

U.S. PATENT DOCUMENTS

| | | | | |
|---|---|---|---|---|
| 3,556,239 | 11/1971 | Spahn | ................................. | 180/2.2 |
| 4,318,449 | 3/1982 | Salisbury | ........................... | 180/65.4 |
| 4,347,907 | 9/1982 | Downing | ............................ | 180/65.4 |
| 4,351,405 | 9/1982 | Fields | ................................ | 180/65.2 |

FOREIGN PATENT DOCUMENTS 422537  4/1967  France ............................... 180/65.4

Primary Examiner—Joseph F. Peters, Jr.
Assistant Examiner—Joseph G. McCarthy

[57] ABSTRACT

A battery-driven car which has an electrical system including a minimum number of electric storage batteries as the power source, a high-voltage converter with a high-voltage capacitor bank for driving a direct current impulse motor combined with a generator for supplying current to motor/generator sets respectively integrated with the wheels of the vehicle to drive the same or for recharging the batteries in accordance with a microprocessor control system, the wheel-actuated generators providing recharging current for the batteries whenever the motor component is not being energized and in addition, said electrical system also including an air-driven turbine generator component for recharging the batteries when the vehicle reaches a predetermined speed in accordance with the microprocessor controls.

1 Claim, 3 Drawing Figures

BATTERY-DRIVEN VEHICLE AND RECHARGING SYSTEM

BACKGROUND OF THE INVENTION

Most battery-operated vehicles are not equipped with generators for recharging the batteries when the vehicle is in motion. Furthermore, in the present invention, also it is believed that the use of the combination of a high-voltage impulse motor similar to that disclosed in my co-pending application Ser. No. 178,758, filed in the U.S. Patent and Trademark Office on Aug. 18, 1980, entitled REPULSION MOTOR, substantially increases the efficiency over a conventional battery-to-wheel electric motor power system, and permits the use of fewer batteries than would be necessary for conventional electrically-operated vehicles, thus reducing the vehicle weight.

SUMMARY OF THE INVENTION

This invention provides a battery-driven vehicle which is substantially more efficient than present vehicles and provides a microprocessor control system for recharging the batteries using the momentum of the vehicle as the power source and in addition, for using an air turbine generator unit for providing battery recharging current when the vehicle is in motion at speeds where an air turbine generator can be efficiently operated. A motor/generator set is integrated with each of the wheels to provide independent driving power for each wheel, the microprocessor controlling the electric power to the respective wheels in accordance with the position of the steering wheel and accelerator pedal.

Another element of the invention is the use of an impulse motor with a high-voltage converter and capacitor to provide the driving power for a direct current generator to provide the power for energizing the respective wheel-connected motors to drive the same, said motors also providing a generator function when not in use in their wheel-driving function.

The microprocessor receives a signal from a digital encoder connected to the steering wheel to vary the power to the wheel motors in accordance with the steering wheel position to produce a "differential effect" in the individual wheel-driving motors and also actuating the wheel generators whenever the accelerator pedal is released.

DETAILED DESCRIPTION OF THE PREFERRED EMBODIMENT AS SHOWN IN THE ACCOMPANYING DRAWINGS

Figure 1:
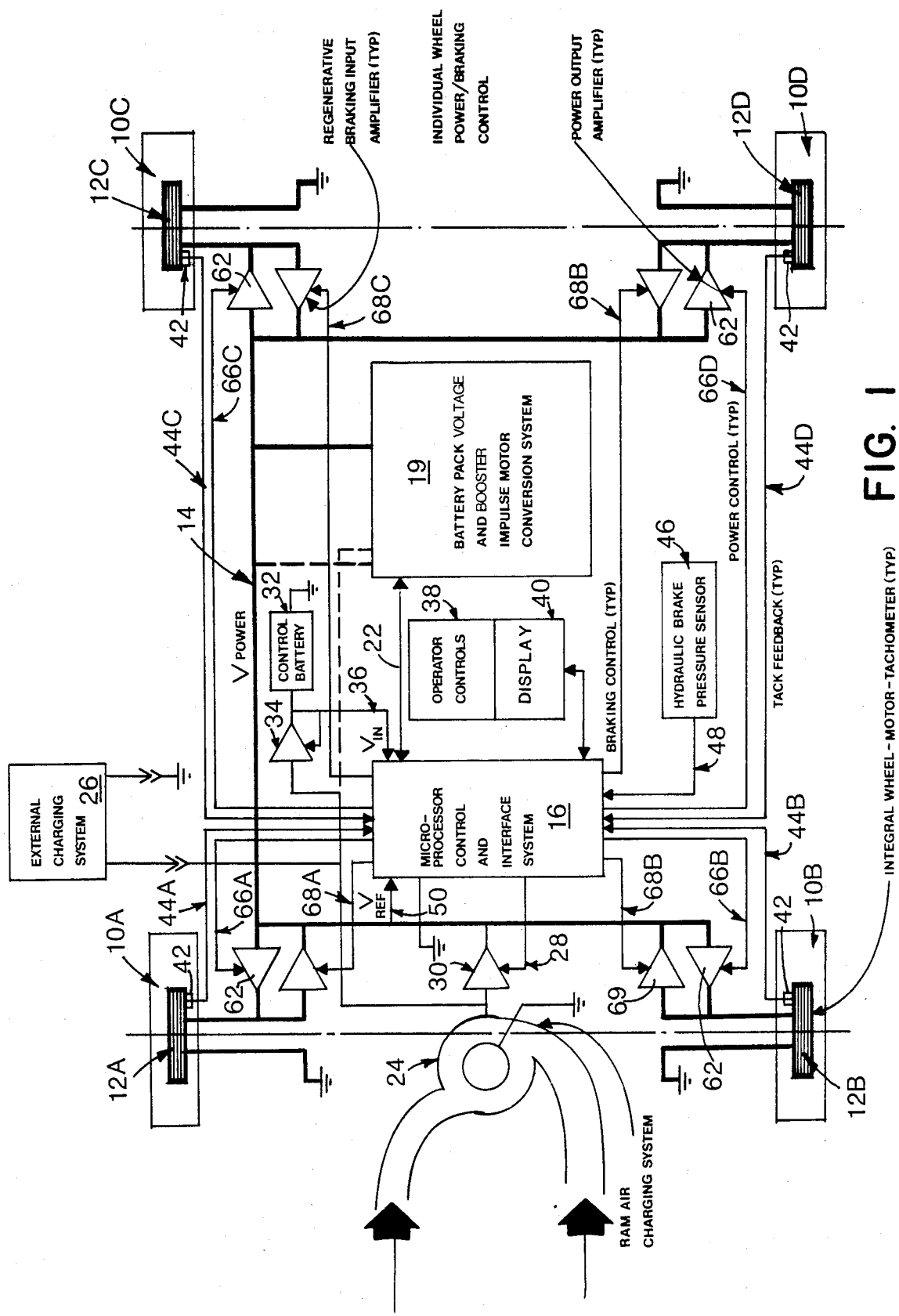
FIG. 1 is a diagrammatic plan view showing a vehicle embodying my invention.

FIG. 1 shows an electrical block diagram of the control system of the electrical vehicle of the present invention. As shown in FIG. 1, each wheel 10A–10D is integrated with a motor generator set 12A–12D which drives the wheels respectively. Power to and from motor generator units 12A–12D is provided on bus 14 which is preferably a multiconductor power distribution bus.

Microprocessor control system 16 provides control signals which are used to route current to and from the individual motor generator units 12A–12D. Microprocessor control system 16 preferably includes an 8-bit or 16-bit microprocessor or microcomputer together with a high frequency clock, random access memory (RAM) data storage, read only memory (ROM) program storage, and interface circuitry for interfacing the microprocessor with the remaining circuitry of the electrical systems of the vehicle. Microprocessor control system 16 also controls the routing of electrical power to and from battery pack and voltage booster 18, which includes a plurality of storage batteries and associate devices to generate a high voltage current (such as a conventional DC to DC converter). The control by microprocessor control system 16 of current flow to and from the power assembly 19 which includes battery pack, voltage booster, and the impulse motor conversion system (FIG. 1), is provided by an array of control switches 20 (FIG. 2) which are connected between the individual batteries of battery pack and voltage booster 18 and power bus 14. The control signals to switches 20 are provided by microprocessor control system 16 on control line 22.

The system of the present invention provides recharging of battery and voltage booster pack 18 selectively from several different sources. These include the generators within each motor generator unit 12A–12D, from air charging system 24 (which preferably includes a wind-driven turbine), and from external charging system 26. Microprocessor control system 16 controls the supply of electrical power from air charging system 24 onto power bus 14 through control line 28, which supplies a control signal to control switch 30. Control switch 30 also controls the application of power from external charging system 26 to power bus 14.

Electrical power from air charging system 24 and from external charging system 26 is also selectively applied to control battery 32 through control switch 34. Control battery 32 provides the electrical power for the electronic components of the control system, particularly microprocessor control system 16. Microprocessor control system 16 controls the state of control switch 34 through control line 36.

Figure 3:
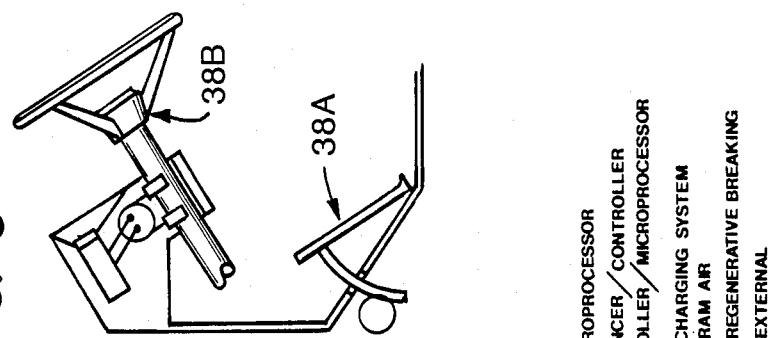
FIG. 3 is a diagrammatic view showing the accelerator pedal and steering wheel position sensing components.

Microprocessor control system 16 receives operator control inputs from operator controls 38, which include an accelerator pedal 38A and a steering wheel 38B, both of which include a conventional position sensing device such as an optical encoder driven by actuation of the accelerator pedal 38A (or the steering column 38B) and which is combined with a digital counter for counting encoder pulses or as an alternative sensor, a potentiometer driven by the accelerator or steering column, together with an analog-to digital (A/D) converter as shown diagrammatically in FIG. 3. These control signals include, for example, the accelerator signal through which the operator determines the speed of the vehicle. The accelerator signal is derived from a conventional accelerator pedal 38A by converting the position of the acceleration pedal to an electrical signal which is digitized and supplied to microprocessor control system 16. Similarly, a digital signal representative of the position of steering wheel 38B is also supplied to microprocessor control system 16.

Microprocessor control system 16 provides status readouts on display 40. These readouts include, for example, the speed of the vehicle. Other status indications which are preferably displayed by display 40 include an indication of the state of charge of battery pack 18, so that the operator knows when external charging will be necessary in order to recharge battery pack 18.

Microprocessor control system 16 receives speed feedback signals indicating the speed of each of the wheels 10A-10D from speed sensors 42 contained within each motor/generator unit 12A-12D. These speed feedback signals are supplied on lines 44A-44D to microprocessor control system 16. From these feedback signals, microprocessor control system 16 is able to derive the vehicle velocity as well as acceleration rate information needed in controlling the flow of power on power bus 14.

Microprocessor control system 16 also receives a signal from hydraulic brake pressure sensor 46 on line 48. The signal from hydraulic brake pressure sensor 46 provides information indicating when and how hard the vehicle is being braked.

Microprocessor control system 16 also monitors the power levels on power bus 14 through control line 50. This information is needed to monitor and control power on power bus 14 to conserve the energy stored in battery pack 18.

Figure 2:
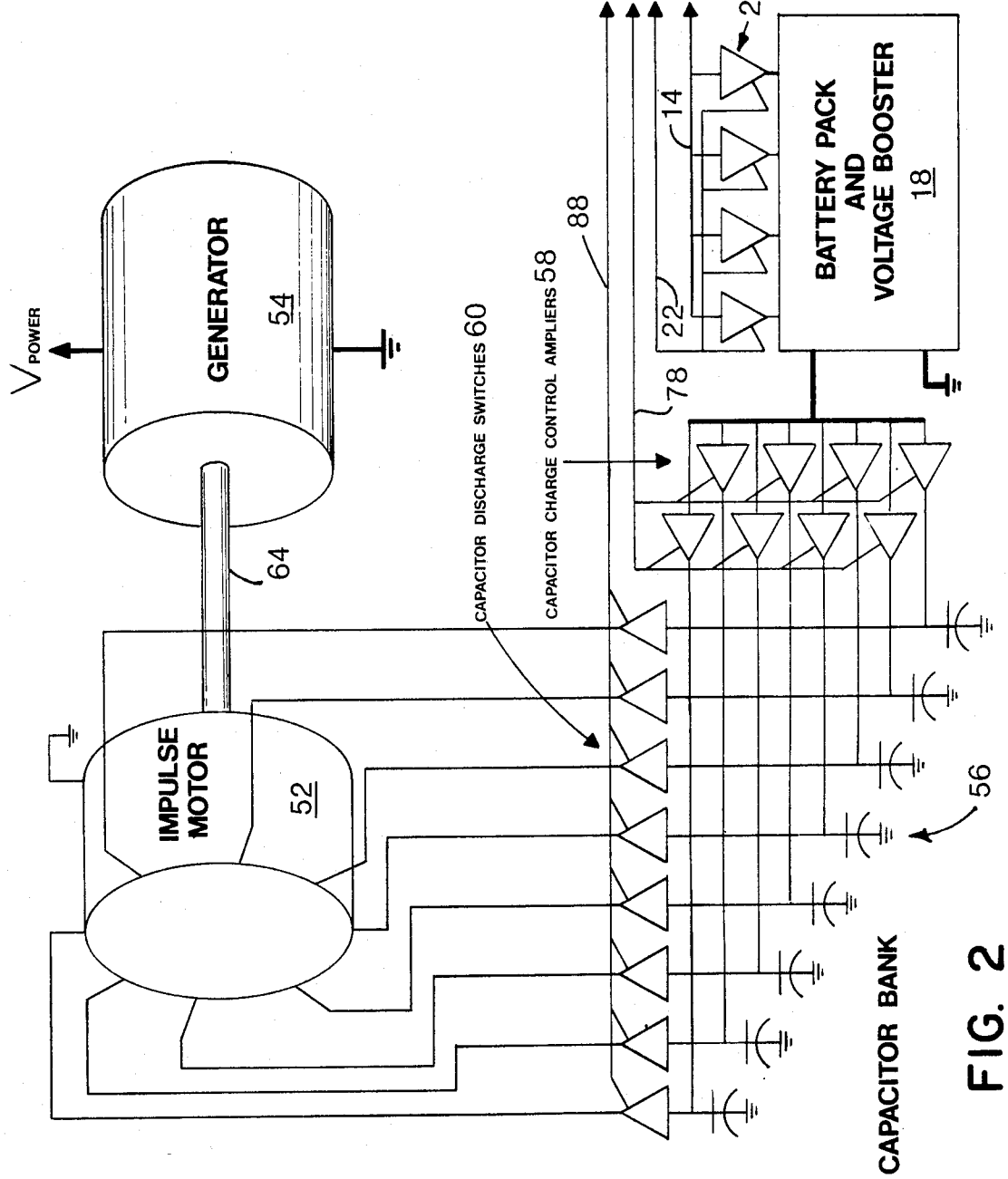
FIG. 2 is a circuit diagram showing a portion of the electric circuitry.

FIG. 2 is a schematic of the battery pack and impulse motor conversion system 19. This unit includes battery pack and voltage booster 18, impulse motor 52, generator 54, a bank of capacitors 56, capacitor charge control switches 58, capacitor discharge switches 60.

The primary source of power for driving impulse motor 52 is the battery pack and voltage booster 18 (FIG. 1). The output of battery pack and voltage booster 18 is supplied directly to the capacitor bank 56 through the microprocessor control system 16 as it selectively charges capacitors by selectively activating capacitor charge control switches 58 through lines 78. To drive impulse motor 52 microprocessor control system 16 selectively activates capacitor discharge switches 60 through control line 88. Capacitors 56 are sequentially discharged under the control of microprocessor control system 16 through switches 60 so that high voltage electrical current is supplied to the various windings of impulse motor 52 in a sequential manner. The impulse motor thus drives power generator 54 which in turn supplies current to generator/motor sets 12A through 12D.

Microprocessor control system 16 controls the speed of impulse motor 52 based upon the feedback speed signals from speed sensors 42 located in each wheel motor generator 12A through 12D. The speed signals are supplied on lines 44A through 44D. The current supplied to motor generator sets 12A-12D is controlled by microprocessor control system 16 through control lines 66A-66D.

It can be seen that the present invention permits individual control of each wheel speed by microprocessor control system 16. As a result, the need for differential gearing and associated mechanisms used in conventional vehicles is eliminated.

Generator 54 is driven by the impulse motor through shaft 64 which produces an electrical current. This electrical current is supplied onto power bus 14 selectively by microprocessor control system 16 through control switch 62 through control lines 66A-66D. Control of power from motor generator units 12A-12D onto power bus 14 is similarly controlled by microprocessor control system 16 through control lines 68A through 68D and control switches 69.

During normal operation of the vehicle, microprocessor control system 16 individually controls each of the motor generator units 12A-12D to drive one or more of the wheels 10A-10D. The drive signal supplied through lines 66A through 66D is integrated by microprocessor 16 and compared against speed demand inputed by position of the accelerator pedal of operator control 38. The signal (if any) from hydraulic brake pressure sensor 46 and the stored data and program contained in RAM and ROM storage within microprocessor control system 16 determines whether the motor generator sets 12A-12D are being driven or generating. The speed of the various motor units 12A-12D and thus the speed of the wheels 10A-10D is dependent in particular upon the position of the accelerator pedal which is one of the operator controls 38. In addition, because wheels 10A-10D are individually controlled, the position of the steering wheel, which is another of the signals from operator control 38, is also used by microprocessor control system 16 to individually control the speed of wheels 10A-10D to provide a differential drive while turning.

When recharging of one or more of the batteries of battery pack 18 is required, microprocessor control system 16 provides control signals on control lines 68A-68D to route current generated by generators 12A-12D onto the power bus during deceleration. This switches motor/generator units 12A through 12D from operation as a motor to that of a generator driven by the respective wheels 10A-10D. When generators 12A through 12D are being operated, microprocessor control system 16 provides appropriate signals on control lines 78 and 88 so that impulse motors 52 are disabled. This feature of the present invention extends vehicle range on a given charge from external charging system 26. Whenever downhill braking or deceleration is occurring, current is provided to recharge battery pack 18.

At high speed, and possibly also during deceleration, microprocessor control system 16 also provides the necessary control signal on line 28 to allow current produced by a generator driven by ram air charging system 24 to be supplied onto power bus 14. As a result, the energy in the high-velocity air around the vehicle is utilized to recharge battery pack 18.

What is claimed is:

1. A battery-driven vehicle comprising,
   a wheeled vehicle,
   at least one combination motor/generator set mounted on a wheel of the vehicle,
   a battery pack and a DC to DC voltage booster component forming a basic power source,
   an impulse motor,
   a bank of capacitors with charge control switches and discharge switches providing a pulsating current to said impulse motor,
   a generator driven by said impulse motor and supplying current to the motor of the wheel-mounted motor/generator set for driving the wheel,
   a microprocessor controlling the current flow from said generator and to said battery pack during charging from the wheel mounted recharging generator, depending upon the position of the accelerator switch,
   said accelerator control including means for converting the motor/generator unit to a generating mode through said microprocessor control system whenever the accelerator pedal is released and the battery pack requires charging.

* * * * *